US011377341B2

(12) United States Patent
Shock

(10) Patent No.: US 11,377,341 B2
(45) Date of Patent: Jul. 5, 2022

(54) MOBILE DISTRIBUTION STATION WITH ADDITIVE INJECTOR

(71) Applicant: Fuel Automation Station, LLC, Birmingham, MI (US)

(72) Inventor: Ricky Dean Shock, Victoria, TX (US)

(73) Assignee: FUEL AUTOMATION STATION, LLC, Birmingham, MI (US)

(*) Notice: Subject to any disclaimer, the term of this patent is extended or adjusted under 35 U.S.C. 154(b) by 147 days.

(21) Appl. No.: 16/161,159

(22) Filed: Oct. 16, 2018

(65) Prior Publication Data
US 2019/0127208 A1    May 2, 2019

Related U.S. Application Data

(63) Continuation of application No. 15/795,697, filed on Oct. 27, 2017, now Pat. No. 10,150,662.

(51) Int. Cl.
*B67D 7/08* (2010.01)
*B67D 7/04* (2010.01)
(Continued)

(52) U.S. Cl.
CPC ............... *B67D 7/08* (2013.01); *B60P 3/035* (2013.01); *B62D 63/08* (2013.01); *B67D 7/04* (2013.01);
(Continued)

(58) Field of Classification Search
CPC .......... B67D 7/08; B67D 7/04; B67D 7/3272; B67D 7/40; B67D 7/78; B67D 7/84;
(Continued)

(56) References Cited

U.S. PATENT DOCUMENTS 2,516,150 A    7/1950  Samiran
2,611,523 A *  9/1952  Aines ...................... B65B 39/00
                                                    141/231
(Continued)

FOREIGN PATENT DOCUMENTS

GB      2485832      5/2012
WO      0177006      10/2001
(Continued)

OTHER PUBLICATIONS

Oilfield Business: Technologies. Frac Shack Inc. introduces world's first Bi-Fuel Distribution Unit for hydraulic fracturing industry. Texas Oil & Gas: The National Magazine for Oil & Gas in Texas. vol. 4, Issue 2. 2015. p. 27.
(Continued)

*Primary Examiner* — Timothy L Maust
*Assistant Examiner* — James R Hakomaki
(74) *Attorney, Agent, or Firm* — Carlson, Gaskey & Olds, P.C.

(57) ABSTRACT

A distribution station includes a mobile trailer and a delivery system. The delivery system includes a pump, a manifold fluidly connected with the pump, reels, hoses, valves situated between the manifold and a respective different one of the hoses, and fluid level sensors. There is also an additive injector fluidly connected with the delivery system and operable to introduce controlled amounts of an additive into the delivery system.

14 Claims, 3 Drawing Sheets

(51) Int. Cl.
*B67D 7/32* (2010.01)
*B67D 7/40* (2010.01)
*B67D 7/84* (2010.01)
*B60P 3/035* (2006.01)
*B62D 63/08* (2006.01)
*B67D 7/78* (2010.01)
*B67D 7/74* (2010.01)
*E21B 43/26* (2006.01)

(52) U.S. Cl.
CPC ............ *B67D 7/3272* (2013.01); *B67D 7/40* (2013.01); *B67D 7/74* (2013.01); *B67D 7/78* (2013.01); *B67D 7/84* (2013.01); *B67D 7/845* (2013.01); *E21B 43/26* (2013.01)

(58) Field of Classification Search
CPC .......... B67D 7/845; B67D 7/74; B60P 3/035; B62D 63/08; E21B 43/26
USPC ....................................................... 141/231
See application file for complete search history.

(56) References Cited

U.S. PATENT DOCUMENTS

| | | | |
|---|---|---|---|
| 2,742,188 A * | 4/1956 | Bills | B67D 7/763 |
| | | | 222/72 |
| 2,769,572 A | 11/1956 | Harman et al. | |
| 2,777,461 A | 1/1957 | Wildhaber | |
| 3,028,010 A | 4/1962 | Headrick | |
| 3,136,295 A | 6/1964 | Gramo | |
| 3,179,291 A * | 4/1965 | Umbach | B67D 7/743 |
| | | | 222/20 |
| 3,425,435 A * | 2/1969 | Garabello | B01F 15/0416 |
| | | | 137/99 |
| 3,441,042 A * | 4/1969 | Reiser | G05D 11/006 |
| | | | 137/101.31 |
| 3,547,141 A | 12/1970 | Alexander | |
| 3,618,643 A | 11/1971 | Thomson | |
| 3,656,134 A | 4/1972 | Brown | |
| 4,007,876 A * | 2/1977 | Stevenson | A01M 7/0085 |
| | | | 239/10 |
| 4,139,019 A | 2/1979 | Bresie et al. | |
| 4,276,997 A * | 7/1981 | Ambler | B67D 7/743 |
| | | | 222/145.4 |
| 4,591,115 A | 5/1986 | DeCarlo | |
| 4,886,367 A * | 12/1989 | Bragg | B01F 3/088 |
| | | | 366/132 |
| 4,930,665 A | 6/1990 | Devine | |
| 5,022,428 A * | 6/1991 | Vilines | B67D 7/74 |
| | | | 137/209 |
| 5,044,074 A * | 9/1991 | Hadwiger | B32B 15/08 |
| | | | 156/324 |
| 5,118,008 A * | 6/1992 | Williams | B67D 7/744 |
| | | | 222/14 |
| 5,163,586 A * | 11/1992 | Zinsmeyer | B67D 7/744 |
| | | | 222/14 |
| 5,406,988 A | 4/1995 | Hopkins | |
| 5,441,072 A * | 8/1995 | Indey | F02D 19/12 |
| | | | 123/1 A |
| 5,454,408 A | 10/1995 | DiBella et al. | |
| 5,503,199 A | 4/1996 | Whitley, II et al. | |
| 5,538,051 A | 7/1996 | Brown et al. | |
| 5,629,863 A * | 5/1997 | Palozzi | G05D 11/133 |
| | | | 222/14 |
| 5,708,424 A | 1/1998 | Orlando et al. | |
| 5,878,772 A * | 3/1999 | Belyea | B67D 7/743 |
| | | | 137/101.21 |
| 5,887,567 A | 3/1999 | White et al. | |
| 5,992,473 A * | 11/1999 | Hammonds | F02M 25/14 |
| | | | 417/408 |
| 5,884,675 A | 12/1999 | Krasnov | |
| 6,068,672 A * | 5/2000 | Watson | F02M 25/00 |
| | | | 44/903 |
| 6,109,286 A * | 8/2000 | Johnston | B67D 7/74 |
| | | | 137/565.33 |
| 6,206,056 B1 | 3/2001 | Lagache | |
| 6,564,615 B1 | 5/2003 | Carter | |
| 6,651,706 B2 | 11/2003 | Litt | |
| 6,697,705 B2 | 2/2004 | Johnson et al. | |
| 6,745,801 B1 | 6/2004 | Cohen et al. | |
| 6,755,225 B1 | 6/2004 | Niedwiecki et al. | |
| 6,761,194 B1 | 7/2004 | Blong | |
| 6,786,245 B1 | 9/2004 | Eichelberger et al. | |
| 6,867,729 B2 | 3/2005 | Berry et al. | |
| 7,063,276 B2 | 6/2006 | Newton | |
| 7,106,026 B2 | 9/2006 | Moore | |
| 7,353,808 B2 | 4/2008 | Kakoo | |
| 7,401,511 B2 | 7/2008 | Dietmeier | |
| 7,415,995 B2 | 8/2008 | Plummer et al. | |
| 7,458,543 B2 | 12/2008 | Cutler et al. | |
| 7,568,507 B2 | 8/2009 | Farese et al. | |
| 7,610,806 B2 | 11/2009 | Skinner | |
| 7,602,143 B2 | 12/2009 | Capizzo | |
| 7,628,182 B2 | 12/2009 | Poulter | |
| 7,938,151 B2 | 5/2011 | Hockner | |
| 7,990,275 B1 * | 8/2011 | Milanovich | F02M 37/0082 |
| | | | 210/741 |
| 8,069,885 B2 | 12/2011 | Kederer et al. | |
| 8,211,296 B2 * | 7/2012 | Angelilli | C02F 1/76 |
| | | | 210/87 |
| 8,959,998 B2 | 2/2015 | Birtcher et al. | |
| 9,080,529 B1 * | 7/2015 | Klughart | F02D 41/2467 |
| 9,346,662 B2 | 5/2016 | Van Vliet et al. | |
| 9,371,830 B2 | 6/2016 | Moffitt, Jr. | |
| 9,371,831 B2 | 6/2016 | Moffitt, Jr. | |
| 9,434,598 B2 | 9/2016 | Pick et al. | |
| 9,586,805 B1 | 3/2017 | Shock | |
| 9,725,295 B2 | 8/2017 | McKay et al. | |
| 9,821,288 B2 * | 11/2017 | Cerk | B01J 19/0006 |
| 2004/0163731 A1 | 8/2004 | Eichelberger et al. | |
| 2004/0187950 A1 | 9/2004 | Cohen et al. | |
| 2007/0079891 A1 | 4/2007 | Farese et al. | |
| 2007/0164031 A1 | 7/2007 | Holz | |
| 2007/0181212 A1 | 8/2007 | Fell | |
| 2008/0078244 A1 | 4/2008 | Dietmeier | |
| 2009/0187416 A1 * | 7/2009 | Baer | B67D 7/348 |
| | | | 705/1.1 |
| 2009/0314384 A1 | 12/2009 | Brakefield et al. | |
| 2010/0018605 A1 | 1/2010 | Bentivoglio | |
| 2010/0200609 A1 * | 8/2010 | Cadigan | B60S 5/02 |
| | | | 222/144.5 |
| 2010/0263266 A1 * | 10/2010 | Nelson, Jr. | C10L 1/00 |
| | | | 422/105 |
| 2011/0197988 A1 | 8/2011 | Van Vliet et al. | |
| 2016/0076533 A1 | 3/2016 | Moffitt, Jr. | |
| 2018/0237289 A1 * | 8/2018 | Markwardt | B67D 7/36 |

FOREIGN PATENT DOCUMENTS

| | | |
|---|---|---|
| WO | 2006005686 | 1/2006 |
| WO | 2008083830 | 7/2008 |
| WO | 2009026607 | 3/2009 |

OTHER PUBLICATIONS

Frac Shack International. Publications & Endorsements. Retrieved Aug. 23, 2016 from: http://www.fracshack.com.
Frac Shack International. Technology. Retrieved Aug. 23, 2016 from: http://www.fracshack.com.
Frac Shack International. Design Benefits. Retrieved Aug. 23, 2016 from: http://www.fracshack.com.
Frac Shack International. Service. Retrieved Aug. 23, 2016 from: http://www.fracshack.com.
Frac Shack International. Frac Shack Series—Series A. Retrieved Aug. 23, 2016 from: http://www.fracshack.com.
Frac Shack International. Frac Shack Series—Series B. Retrieved Aug. 23, 2016 from: http://www.fracshack.com.
Frac Shack International. Frac Shack Series—Series C. Retrieved Aug. 23, 2016 from: http://www.fracshack.com.

(56) References Cited

OTHER PUBLICATIONS

Frac Shack International. Frac Shack Series—Series D. Retrieved Aug. 23, 2016 from: http://www.fracshack.com.
Frac Shack International. Frac Shack Series—Series E. Retrieved Aug. 23, 2016 from: http://www.fracshack.com.
Frac Shack International. Frac Shack Series—Series EG. Retrieved Aug. 23, 2016 from: http://www.fracshack.com.
Mann Tek. Dry Disconnect Couplings. Retrieved Jul. 22, 2016 from: http://www.manntek.com/products/drydisconnectcouplings p. 1-4.
Mann Tek. Dry Aviation Couplings. Retrieved Jul. 22, 2016 from: http://www.manntek.com/products/dryaviationcouplings p. 1-4.
Waterman, J. (2013). Better Safe than Sorry: Frac Shack a welcome addition to the oil patch. Jan. 2, 2013. Retrieved Aug. 23, 2016 from: http://www.pipelinenewsnorth.ca/better-safe-than-sorry-1.1123066.
U.S. Appl. No. 15/655,115, filed Jul. 20, 2017.
U.S. Appl. No. 15/782,335, filed Oct. 12, 2017.
U.S. Appl. No. 15/673,730, filed Aug. 10, 2017.
U.S. Appl. No. 15/673,796, filed Aug. 10, 2017.
U.S. Appl. No. 15/416,198, filed Jan. 26, 2017.
U.S. Appl. No. 15/703,285, filed Sep. 13, 2017.

\* cited by examiner

MOBILE DISTRIBUTION STATION WITH ADDITIVE INJECTOR

CROSS-REFERENCE TO RELATED APPLICATIONS

The present disclosure is a continuation of U.S. patent application Ser. No. 15/795,697 filed Oct. 27, 2017.

BACKGROUND

Hydraulic fracturing (also known as fracking) is a well-stimulation process that utilizes pressurized liquids to fracture rock formations. Pumps and other equipment used for hydraulic fracturing typically operate at the surface of the well site. The equipment may operate semi-continuously, until refueling is needed, at which time the equipment may be shut-down for refueling. Shut-downs are costly and reduce efficiency. More preferably, to avoid shut-downs fuel is replenished in a hot-refueling operation while the equipment continues to run. This permits fracking operations to proceed fully continuously; however, hot-refueling can be difficult to reliably sustain for the duration of the fracking operation.

SUMMARY

A distribution station according to an example of the present disclosure includes a mobile trailer, a delivery system that has a pump on the mobile trailer, a manifold on the mobile trailer and fluidly connected with the pump, a plurality of reels on the mobile trailer, and a plurality of hoses connected, respectively, with the reels. The reels are fluidly connected with the manifold and each of the valves are situated between the manifold and a respective different one of the hoses. Each of the sensors is associated with a respective different one of the hoses. An additive injector is fluidly connected with the delivery system and operable to introduce controlled amounts of an additive into the delivery system.

A distribution station according to an example of the present disclosure includes an injection system that has a controller and an additive injector fluidly connected with the delivery system. The controller is configured to operate the additive injector and introduce controlled amounts of an additive into the delivery system.

A distribution station according to an example of the present disclosure includes a container that has an additive and an additive injector fluidly connected with the container. The delivery system is operable to introduce controlled amounts of the additive.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
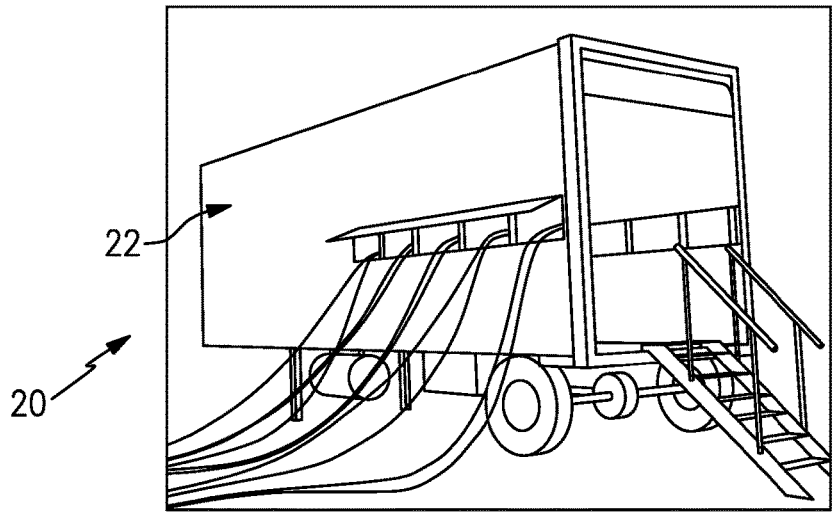
FIG. 1 illustrates an example mobile distribution station.
Figure 2:
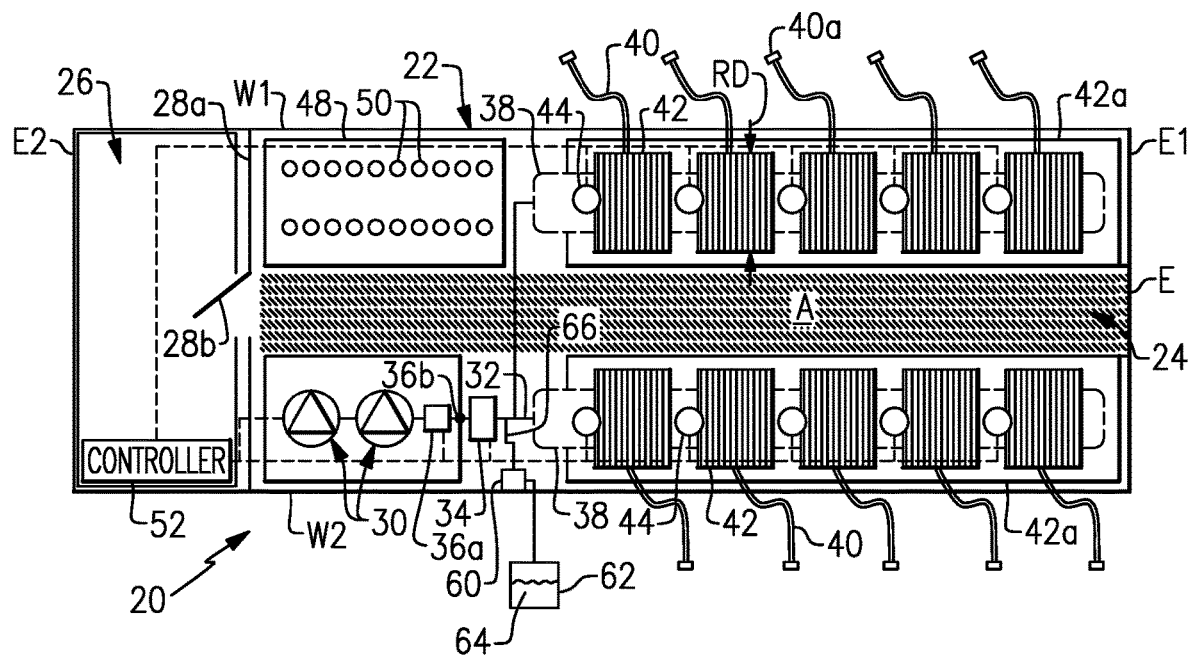
FIG. 2 illustrates an internal layout of a mobile distribution station.

FIG. 1 illustrates a mobile distribution station 20 and FIG. 2 illustrates an internal layout of the station 20. As will be described, the station 20 may serve in a "hot-refueling" capacity to distribute fuel to multiple pieces of equipment while the equipment is running, such as fracking equipment at a well site. As will be appreciated, the station 20 is not limited to applications for fracking or for delivering fuel. The examples herein may be presented with respect to fuel delivery, but the station 20 may be used in mobile delivery of other fluids, in other gas/petroleum recovery operations, or in other operations where mobile refueling or fluid delivery will be of benefit.

In this example, the station 20 includes a mobile trailer 22. Generally, the mobile trailer 22 is elongated and has first and second opposed trailer side walls W1 and W2 that join first and second opposed trailer end walls E1 and E2. Most typically, the trailer 22 will also have a closed top (not shown). The mobile trailer 22 may have wheels that permit the mobile trailer 22 to be moved by a vehicle from site to site to service different hot-refueling operations.

In this example, the mobile trailer 22 has two compartments. A first compartment 24 includes the physical components for distributing fuel, such as diesel fuel, and a second compartment 26 serves as an isolated control room for managing and monitoring fuel distribution. The compartments 24/26 are separated by an inside wall 28a that has an inside door 28b.

The first compartment 24 includes one or more pumps 30. Fuel may be provided to the one or more pumps 30 from an external fuel source, such as a tanker truck on the site. On the trailer 22, the one or more pumps 30 are fluidly connected via a fuel line 32 with a high precision register 34 for metering fuel. The fuel line 32 may include, but is not limited to, hard piping. In this example, the fuel line 32 includes a filtration and air eliminator system 36a and one or more sensors 36b. Although optional, the system 36a is beneficial in many implementations, to remove foreign particles and air from the fuel prior to delivery to the equipment. The one or more sensors 36b may include a temperature sensor, a pressure sensor, or a combination thereof, which assist in fuel distribution management.

The fuel line 32 is connected with one or more manifolds 38. In the illustrated example, the station 20 includes two manifolds 38 that arranged on opposed sides of the compartment 24, with an aisle A in between. As an example, the manifolds 38 are elongated tubes that are generally larger in diameter than the fuel line 32 and that have at least one inlet and multiple outlets. Each hose 40 is wound, at least initially, on a reel 42 that is rotatable to extend or retract the hose 40 externally through one or more windows of the trailer 22. Each reel 42 may have an associated motor to mechanically extend and retract the hose 40. The reels 42 and motors may be mounted on a support rack in the station 20. The station 20 may include twenty hoses 40, although fewer or more hoses could be used. Most typically, some of the hoses 40 are deployable from one side of the station 20 and other hoses are deployable from the other side of the station 20.

Figure 3:
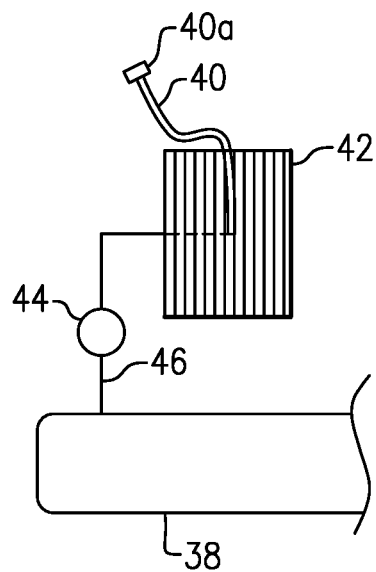
FIG. 3 illustrates an example of a connection between a manifold, a control valve, and a reel.

Referring also to FIG. 3, each hose 40 is connected to a respective one of the reels 42 and a respective one of a plurality of control valves 44. For example, a secondary fuel line 46 leads from the manifold 38 to the reel 42. The control valve 44 is in the secondary fuel line 46. The control valve 44 is moveable between open and closed positions to selectively permit fuel flow from the manifold 38 to the reel 42 and the hose 40. For example, the control valve 44 is a powered valve, such as a solenoid valve.

In the illustrated example, the first compartment 24 also includes a sensor support rack 48. The sensor support rack 48 holds integrated fuel cap sensors 50 (when not in use), or at least portions thereof. When in use, each integrated fuel cap sensor 50 is temporarily affixed to a piece of equipment (i.e., the fuel tank of the equipment) that is subject to the hot-refueling operation. Each hose 40 may include a connector end 40a and each integrated fuel cap sensor 50 may have a corresponding mating connector to facilitate rapid connection and disconnection of the hose 40 with the integrated fuel cap sensor 50. For example, the connector end 40a and mating connector on the integrated fuel cap sensor 50 form a hydraulic quick-connect.

Figure 4:
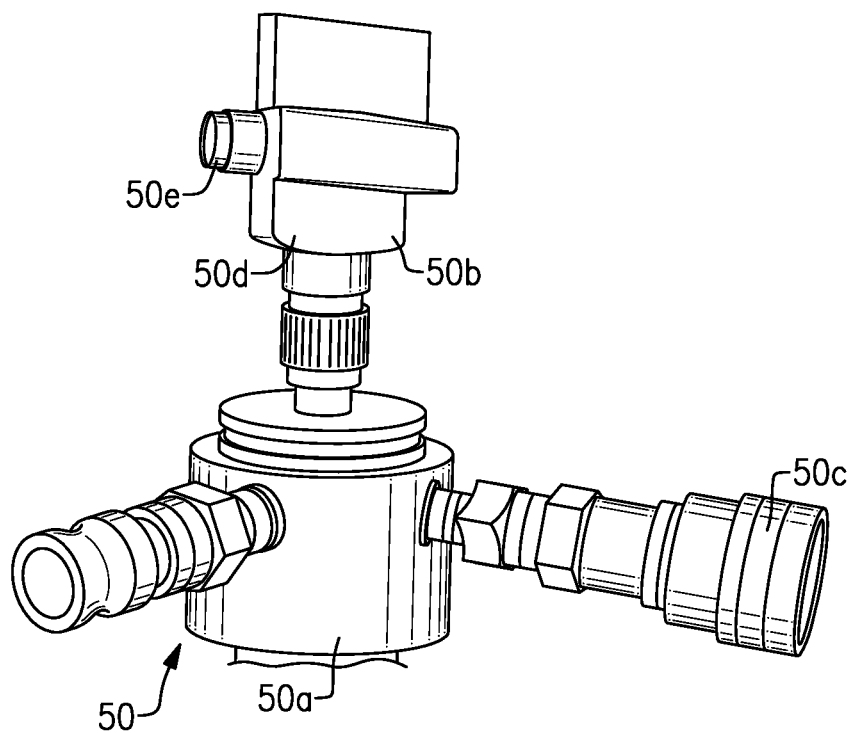
FIG. 4 illustrates an example of an integrated fuel cap sensor for a mobile distribution station.

FIG. 4 illustrates a representative example of one of the integrated fuel cap sensors 50. The integrated fuel cap sensor 50 includes a cap portion 50a and a fluid level sensor portion 50b. The cap portion 50a is detachably connectable with a port of a fuel tank. The cap portion 50a includes a connector port 50c, which is detachably connectable with the connector 60 of the hose 40. The sensor portion 50b includes a sensor 50d and a sensor port 50e that is detachably connectable with a connector. The fuel cap sensor 50 may also include a vent port that attaches to a drain hose, to drain any overflow into a containment bucket and/or reduce air pressure build-up in a fuel tank. Thus, a user may first mount the cap portion 50a on the fuel tank of the equipment, followed by connecting the hose 40 to the port 50c.

The sensor 50d may be any type of sensor that is capable of detecting fluid or fuel level in a tank. In one example, the sensor 50d is a guided wave radar sensor. A guided wave radar sensor may include a transmitter/sensor that emits radar waves, most typically radio frequency waves, down a probe. The probe serves as a guide for the radar waves. The radar waves reflect off of the surface of the fuel and the reflected radar waves are received into the transmitter/sensor. A sensor controller determines the "time of flight" of the radar waves, i.e., how long it takes from emission of the radar waves for the radar waves to reflect back to the transmitter/sensor. Based on the time, the sensor controller, or the controller 52 if the sensor controller does not have the capability, determines the distance that the radar waves travel. A longer distance thus indicates a lower fuel level (farther away) and a shorter distance indicates a higher fuel level (closer).

At least the control valves 44, pump or pumps 30, sensor or sensors 36b, and register 34 are in communication with a controller 52 located in the second compartment 26. As an example, the controller 52 includes software, hardware, or both that is configured to carry out any of the functions described herein. In one further example, the controller 52 includes a programmable logic controller with a touchscreen for user input and display of status data. For example, the screen may simultaneously show multiple fluid levels of the equipment that is being serviced.

When in operation, the integrated fuel cap sensors 50 are mounted on respective fuel tanks of the pieces of equipment that are subject to the hot-refueling operation. The hoses 40 are connected to the respective integrated fuel cap sensors 50. Each integrated fuel cap sensor 50 generates signals that are indicative of the fuel level in the fuel tank of the piece of equipment on which the integrated fuel cap sensor 50 is mounted. The signals are communicated to the controller 52.

The controller 52 interprets the signals and determines the fuel level for each fuel tank of each piece of equipment. In response to a fuel level that falls below a lower threshold, the controller 52 opens the control valve 44 associated with the hose 40 to that fuel tank and activates the pump or pumps 30. The pump or pumps 30 provide fuel flow into the manifolds 38 and through the open control valve 44 and reel 42 such that fuel is provided through the respective hose 40 and integrated fuel cap sensor 50 into the fuel tank. The lower threshold may correspond to an empty fuel level of the fuel tank, but more typically the lower threshold will be a level above the empty level to reduce the potential that the equipment completely runs out of fuel and shuts down. The controller 52 can also be programmed with a failsafe measure related to the operation of the fuel cap sensors 50. As an example, once a control valve 44 is open, if the controller 52 does not detect a change in fuel level from the fuel cap sensor 50 associated with the control valve 44 within a preset time period, the controller 52 shuts the pump 30 off and closes the control valve 44. Thus, if a hose 40 were to rupture, spillage of fuel is limited to the volume of fuel in the hose 40. For instance, the preset time period may be three seconds, six seconds, ten seconds, or fifteen seconds, which may limit spillage to approximately fifteen gallons for a given size of hose.

The controller 52 also determines when the fuel level in the fuel tank reaches an upper threshold. The upper threshold may correspond to a full fuel level of the fuel tank, but more typically the upper threshold will be a level below the full level to reduce the potential for overflow. In response to reaching the upper threshold, the controller 52 closes the respective control valve 44 and ceases the pump or pumps 30. If other control valves 44 are open or are to be opened, the pump or pumps 30 may remain on. The controller 52 can also be programmed with an electronic stop failsafe measure to prevent over-filling. As an example, once an upper threshold is reached on a first tank and the control valve 44 is closed, but the pump 30 is otherwise to remain on to fill other tanks, if the fuel level continues to rise in the first tank, the controller 52 shuts the pump 30 off.

Multiple control valves 44 may be open at one time, to provide fuel to multiple fuel tanks at one time. Alternatively, if there is demand for fuel from two or more fuel tanks, the controller 52 may sequentially open the control valves 44 such that the tanks are refueled sequentially. For instance, upon completion of refueling of one fuel tank, the controller 52 closes the control valve 44 of the hose 40 associated with that tank and then opens the next control valve 44 to begin refueling the next fuel tank. The controller 52 may perform the functions above while in an automated operating mode. Additionally, the controller 52 may have a manual mode in which a user can control at least some functions through the PLC, such as starting and stopped the pump 30 and opening and closing control valves 44. For example, manual mode may be used at the beginning of a job when initially filling tanks to levels at which the fuel cap sensors 50 can detect fuel and/or during a job if a fuel cap sensor 50 becomes inoperable. Of course, operating in manual mode may deactivate some automated functions, such as filling at the low threshold or stopping at the high threshold.

In addition to the use of the sensor signals to determine fuel level, or even as an alternative to use of the sensor signals, the refueling may be time-based. For instance, the fuel consumption of a given piece of equipment may be known such that the fuel tank reaches the lower threshold at known time intervals. The controller 52 is operable to refuel the fuel tank at the time intervals rather than on the basis of the sensor signals, although sensor signals may also be used to verify fuel level.

The controller 52 also tracks the amount of fuel provided to the fuel tanks. For instance, the register 34 precisely measures the amount of fuel provided from the pump or pumps 30. As an example, the register 34 is an electronic register and has a resolution of about 0.1 gallons. The register 34 communicates measurement data to the controller 52. The controller 52 can thus determine the total amount of fuel used to very precise levels. The controller 52 may also be configured to provide outputs of the total amount of fuel consumed. For instance, a user may program the controller 52 to provide outputs at desired intervals, such as by worker shifts or daily, weekly, or monthly periods. The outputs may also be used to generate invoices for the amount of fuel used. As an example, the controller 52 may provide a daily output of fuel use and trigger the generation of an invoice that corresponds to the daily fuel use, thereby enabling almost instantaneous invoicing.

For diesel fuels used in re-fueling operations, others fuels, or other liquids, additives may be used to modify one or more properties of the fuel or liquid. Examples based on diesel fuels may include additives that modify handling, gelling, thermal stability, engine protection, and combustion. Example handling additives may include additives that modify freezing, flow, clouding, foaming, static electricity, dyes, odorants, deodorants, and the like. Example stability additives may include anti-oxidants, metal deactivators, biocides, dispersants, and the like. Example engine protection additives may include corrosion inhibitors, cleaners, lubricants, and the like. Example combustion additives may include ignition modifiers, such as cetane boosters, smoke suppressants, catalysts, and the like.

The fuel, as-received, may not initially include such additives. Although such additives may, in some cases, be included during refining or prior to delivery of fuel to the site, not all customers may want to incur the expense of the additive, nor may such additives be needed or required for a particular operation. In order to provide such additives on-site and on-demand, as customers or operations may require, the station 20 includes an additive injector 60 (FIG. 2) fluidly connected with the delivery system of the station 20 and operable to introduce controlled amounts of an additive into the delivery system. The pump(s) 30, manifold(s) 38, hoses 40, reels 42, control valves 44, and fuel cap sensors 50 collectively make up the delivery system of the station 20.

The additive injector 60 may be mounted inside the trailer 22, such as on one of the side walls W1/W2. As shown, the additive injector 60 is fluidly connected with a container 62 that contains an additive 64. In this example, the container 62 is separate from the station 20, although it may alternatively be inside or mounted inside the trailer 22. The additive injector 60 is also fluidly connected, by delivery line 66, to the fuel line 32. The delivery line 66 may be a flexible hose, hard piping, or the like. In this example, the delivery line 66 opens into the fuel line 32 at a location between the pump(s) 30 and the manifold(s) 38. In this case, where there are two manifolds 38, the delivery line 66 opens into the fuel line 32 at a location upstream from a split in the fuel line 32 to each manifold 38. This ensures that the additive 64 is distributed to both manifolds 38.

In this example, the additive injector 60 is or includes a metering pump. A metering pump moves a precise volume of fuel or liquid in a specified time period to provide a controlled volumetric flow rate. The amount of the additive 64 can thus be precisely controlled, monitored, and tracked. Example metering pumps may include, but are not limited to, piston pumps, diaphragm pumps, and parastaltic pumps.

The metering pump may further be a variable speed metering pump, the speed of which can be adjusted to change and control the amount of additive introduced into the delivery system. In this regard, the metering pump can have an integrated controller that can be used to program, adjust, and control introduction of the additive. Additionally or alternatively, the metering pump may be in communication with the controller 52, which may control operation of the metering pump.

The metering pump may introduce the additive 64 continuously or by batch. For continuous introduction the integrated controller or controller 52 operates the metering pump to continuously introduce, i.e., inject, the additive 64 into the delivery system when the pump or pumps 30 are active. For instance, as one or more tanks are being filled, the additive 64 is injected so that the fuel delivered to the tanks has a known, controlled amount of the additive 64. The timeframe over which the additive is injected is equal to or substantially equal to (within about 10%) the timeframe over which the tank is filled. For batch introduction, the integrated controller or controller 52 operates the metering pump to introduce a defined dose amount of the additive 64 over a defined timeframe. For instance, as a tank is being filled, the defined dose of the additive 64 is injected so that the tank has a known, controlled amount of the additive 64. The timeframe over which the dose is injected is less than the timeframe over which the tank is filled.

In one further example, the integrated controller or controller 52 includes a memory that is used to record how much of the additive 64 is delivered into the delivery system. In this regard, the integrated controller or controller 52 can be used to track the amount of additive 64 used over a time period to generate invoices for the amount used. As an example, the integrated controller or controller 52 may provide a daily output of additive use and trigger the generation of an invoice that corresponds to the daily use, thereby enabling almost instantaneous invoicing.

Figure 5:
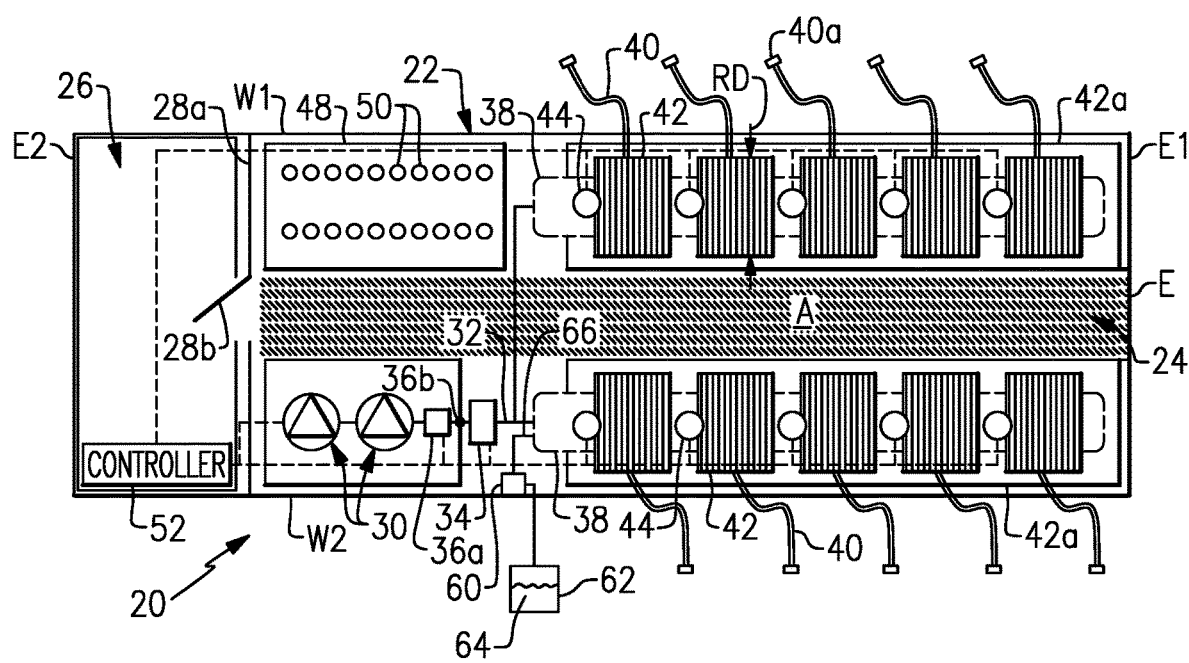
FIG. 5 illustrates another example mobile distribution station.

FIG. 5 illustrates another example of the station 20. In this example, rather than the delivery line 66 of the additive injector 60 opening into the fuel line 32, the delivery line 66 opens into the manifold 38. In this regard, if more than one manifold 38 is used, the additive injector 60 may also be connected to open into the other manifold 38. Alternatively, the additive injector 60 may open into only one of the manifolds 38, while the other manifold 38 does not have the additive 64. Of course, an additional additive injector 60 could be provided and fluidly connected with the other manifold 38 so that both manifolds can provide fuel with the additive 64.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A distribution station comprising:
a mobile trailer;
a delivery system including,
   a pump;
   a manifold connected with the pump;
   reels connected with the manifold;
   hoses connected, respectively, with the reels;
   valves, each said valve being situated between the manifold and a respective different one of the hoses;
   fluid level sensors, each said fluid level sensor being associated with a respective different one of the hoses; and
an injection system including a controller and an additive injector connected with the delivery system, the controller configured to adjust an amount of an additive that the additive injector introduces into a fluid flowing in the delivery system as the delivery system dispenses the fluid from at least one of the hoses.

2. The distribution station as recited in claim 1, wherein the additive injector is fluidly connected to the delivery system by a fluid delivery line, the fluid delivery line opening into the delivery system at a location between the manifold and the pump.

3. The distribution station as recited in claim 2, wherein the additive injector is fluidly connected to the delivery system by a fluid delivery line, the fluid delivery line opening into the delivery system at the manifold.

4. The distribution station as recited in claim 1, wherein the additive injector includes a metering pump, the additive injector is fluidly connected to the delivery system by a fluid delivery line, and the fluid delivery line opens into the delivery system at a location at the manifold or between the manifold and the pump.

5. The distribution station as recited in claim 1, further comprising fuel at least in the manifold.

6. The distribution station as recited in claim 1, wherein the additive injector includes a variable speed metering pump.

7. The distribution station as recited in claim 1, wherein the fluid level sensors are in fuel caps that are respectively connected at ends of the hoses.

8. A distribution station comprising:
a mobile trailer;
a delivery system including,
   a pump;
   a manifold connected with the pump;
   reels connected with the manifold;
   hoses connected, respectively, with the reels;
   valves, each said valve being situated between the manifold and a respective different one of the hoses;
   fluid level sensors, each said fluid level sensor being associated with a respective different one of the hoses; and
an injection system including a controller and an additive injector connected with the delivery system, the controller configured to operate the additive injector and introduce a defined dose of an additive into fluid in the delivery system over a timeframe that is less than a timeframe over which at least one fluid tank is filled with the fluid containing the defined dose.

9. The distribution station as recited in claim 8, wherein the additive injector includes a metering pump.

10. The distribution station as recited in claim 8, wherein the controller is configured to record how much of the additive is delivered into the delivery system.

11. The distribution station as recited in claim 8, wherein the additive injector is fluidly connected to the delivery system by a fluid delivery line, the fluid delivery line opening into the delivery system at a location between the manifold and the pump.

12. The distribution station as recited in claim 8, wherein the additive injector is fluidly connected to the delivery system by a fluid delivery line, the fluid delivery line opening into the delivery system at the manifold.

13. The distribution station as recited in claim 8, wherein the additive injector includes a variable speed metering pump.

14. The distribution station as recited in claim 13, wherein the fluid level sensors are in fuel caps that are respectively connected at ends of the hoses.

* * * * *